United States Patent [19]
Becker et al.

[11] Patent Number: 5,184,463
[45] Date of Patent: Feb. 9, 1993

[54] METHOD OF REDUCING THE EMISSION OF TOXIC EXHAUST GAS COMPONENTS IN AN INTERNAL COMBUSTION ENGINE

[75] Inventors: Ruediger Becker, Murr; Siegfried Boettcher, Remseck; Andreas Franz, Kornwestheim, all of Fed. Rep. of Germany

[73] Assignee: Robert Bosch GmbH, Stuttgart, Fed. Rep. of Germany

[21] Appl. No.: 763,186

[22] Filed: Sep. 20, 1991

[30] Foreign Application Priority Data

Sep. 20, 1990 [DE] Fed. Rep. of Germany ....... 4029811

[51] Int. Cl.$^5$ ................................................ F01N 3/20
[52] U.S. Cl. ................... 60/284; 123/179.1; 123/179.16; 123/339; 123/362; 123/424
[58] Field of Search ................ 123/424, 179.1, 179.16, 123/179.17, 179.18, 362, 491, 421, 339; 60/284

[56] References Cited

U.S. PATENT DOCUMENTS

| 3,813,877 | 6/1974 | Hunt ........................... 123/424 |
|---|---|---|
| 4,144,853 | 3/1979 | Maruoka et al. ............. 123/421 |
| 4,224,913 | 9/1980 | Barnard ....................... 123/179.16 |
| 4,351,297 | 9/1982 | Suematsu .................... 123/424 |
| 4,703,733 | 11/1987 | Fukutomi et al. .......... 123/424 |
| 4,951,633 | 8/1990 | Achleitner et al. ......... 123/179.17 |

FOREIGN PATENT DOCUMENTS 57-129231  8/1982  Japan .......................... 123/179.1

OTHER PUBLICATIONS

"Die Abgasreinigung der neuen Mercedes-Benz 300 SL-24 und 500 SL-Aufbau und Wirkungsweise" by W. Zahn et al. in MTZ 50 (1989), vol. 6, pp. 247 to 254.
"Einspritz-und Zündsysteme der neuen Mercedes-Benz Vierventilmotoren für den SL-Roadster" by W. Strauss et al. in MTZ 50 (1989), vol. 7/8, pp. 333 to 336.

*Primary Examiner*—Andrew M. Dolinar
*Attorney, Agent, or Firm*—Walter Ottesen

[57] ABSTRACT

The invention is directed to a method wherein measures are initiated for accelerating the warm-up of the catalyzer even for a warm engine such as after a warm start thereof. In this way and when there is an interruption of operation, the cooling off of the engine and the catalyzer, which takes place at different rates, and the effect thereof on the conversion rate is opposed. As a consequence thereof, the emission of unwanted exhaust-gas components after a warm start is reduced.

20 Claims, 2 Drawing Sheets

METHOD OF REDUCING THE EMISSION OF TOXIC EXHAUST GAS COMPONENTS IN AN INTERNAL COMBUSTION ENGINE

FIELD OF THE INVENTION

The invention relates to a method of reducing the emission of toxic exhaust-gas components in an internal combustion engine equipped with a catalyzer for which heating functions are carried out.

BACKGROUND OF THE INVENTION

During operation of the internal combustion engine, the catalyzer is heated by means of a heat exchange with the exhaust gases of the engine and is maintained at its operating temperature. After the cold engine is started, a certain time passes until the catalyzer reaches this temperature. In this time, the conversion rate of the catalyzer is not optimal and a high emission of unwanted exhaust-gas components is caused thereby. A reduction of the unwanted emission can be obtained by shortening the time duration which is necessary for reaching the operating temperature of the catalyzer.

The article of Zahn et al entitled "Die Abgasreinigung der neuen Mercedes-Benz 300 SL-24 und 500 SL - Aufbau und Wirkungsweise" printed in the technical journal "MTZ", volume 6, (1989) discloses a method for shortening this time span. In this method, the exhaust-gas temperature is increased after a cold start by adding air behind the exhaust valves and by intervening in the ignition timing. In this way, a larger amount of heat is conducted to the catalyzer under conditions which are otherwise the same thereby accelerating the temperature increase of the catalyzer.

Also, for motor vehicles equipped with an automatic transmission and having the same performance, it is known to increase the level of the rotational speed of the engine after a cold start by changing the shifting program. The increase of the heat quantity transported with the exhaust-gas flow likewise effects an acceleration of the temperature increase of the catalyzer. Such a method is disclosed, for example, in the article of Strauß et al entitled "Einspritz- und Zündsysteme der neuen Mercedes-Benz Vierventilmotoren für den SL-Roadster" published in the journal "MTZ", volume 7/8 (1989).

One disadvantage of the known methods is that the measures for increasing exhaust-gas temperature are applied only during cold start and in the warm-up phase. For this reason, in the case of a restart wherein the engine is still operationally warm such as during city traffic and repeated stops for such things as shopping wherein the engine is shut off for only a short time, still higher toxic emissions can occur. This is caused by the different rapid rates of cooling of the engine on the one hand and the exhaust-gas system containing the catalyzer on the other hand.

The temperature of the catalyzer drops relatively rapidly compared to the compact engine block. For this reason, a deterioration of the conversion rate when restarting occurs without initiating measures of the above-mentioned methods for accelerating a reheating of the catalyzer.

SUMMARY OF THE INVENTION

It is an object of the invention to provide a method for enabling the catalyzer to again more rapidly reach its operating temperature and its optimal conversion rate after a restart while the engine is still warm. The advantage provided hereby lies in the reduced emission of unwanted exhaust-gas components in this operating condition.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
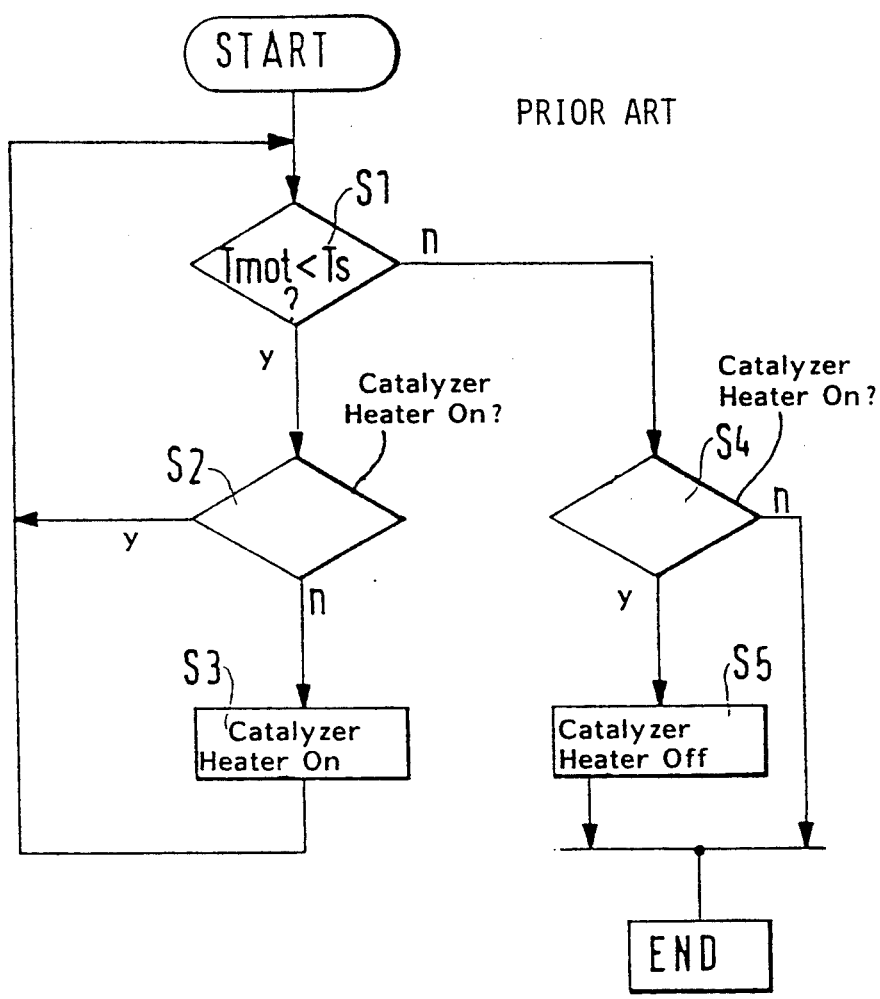
FIG. 1 is a flowchart showing a method for the accelerated warm-up of the catalyzer after a cold start pursuant to the state of the art; and, FIGS. 2 to 4 show an embodiment of the method of the invention which is carried out after the engine is started.

FIG. 1 shows the state of the art and the blocks which represent the start and end of the program with the program steps S1 to S5 being shown next to these blocks. After the engine is started, the engine temperature Tmot is compared in step S1 to a pregiven threshold value Ts. For engine temperatures less than Ts, a check is made in step S2 as to whether measures for accelerated warm-up of the catalyzer have already been initiated. If this is the case, then the loop comprising steps S1 and S2 is run through until a determination is made in step S1 that the engine temperature Tmot has exceeded the threshold value Ts. However, if this is not the case, these measures take place in step S3 and can be, for example, an increase of the idle speed and/or a retarded setting of the ignition timing and/or a leaning of the mixture.

In this case, too, the loop comprising steps S1 and S2 is then run through repeatedly until the condition is satisfied that Tmot has exceeded Ts.

If this condition is already satisfied when the engine is started which is a realistic assumption for example for the situation where there was a stop on the highway for retanking, then the result of the inquiry step S4 is negative wherein a check is made as to whether measures for accelerated warm-up of the catalyzer are operative or not and there is a branching directly to the end of the subprogram. The other case is typically characterized by operative catalyzer warming such as after a cold start. In this other case, the heating measures are cancelled in step S5 before there is a branching to the end of the subprogram.

Figure 2:
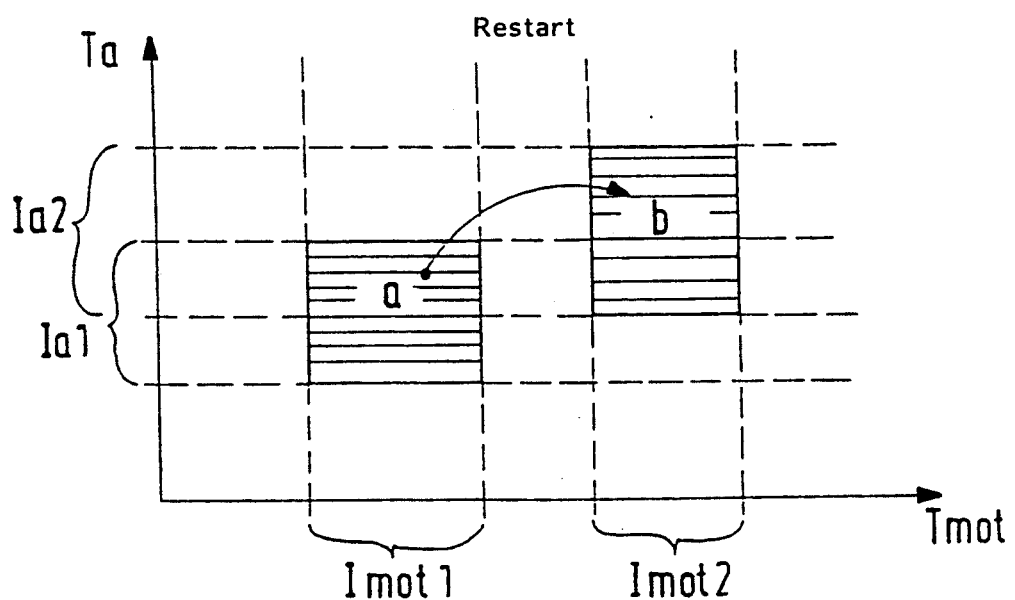

In FIG. 2, a plane is shown which is defined by two temperature axes and which contains two regions identified by (a) and (b), respectively. On the axis identified as Tmot, different intervals Imot of the engine are marked and the intervals Ia on the axis identified by Ta define segments taken from the spectrum of possible values for the intake air temperature. The regions lying in the plane result such that the points lying therein correspond approximately to points from the intervals on the axes. These regions can be interpreted as conditions which are then satisfied when a value pair comprising measured intake air temperature and engine temperature lie in the particular region.

In the method according to the invention, a check is made at a specific time point (for example when the engine is started) as to whether the condition identified in the plane with (a) is satisfied and the result of this check is stored. If this condition was satisfied and additionally, at a later time point, namely at a next start after an operation interruption, the condition identified by (b) is likewise satisfied measures for accelerated warm-up of the catalyzer are initiated. The condition identified by (b) can in this example be so configured that this condition is characteristic for a warm engine. In this case, the catalyzer is only then heated when both conditions are satisfied. That means especially that the heating function is no longer carried out for each warm start.

The condition identified by (n) can however be so configured that the corresponding region in FIG. 2 takes up the entire plane. In this case, the condition is always satisfied and the initiation of measures for catalyzer heating is only dependent on one condition, namely, from the temperature inquiries corresponding to the region (n+1).

This means especially that the heat function is carried out for each warm start.

Figure 3:
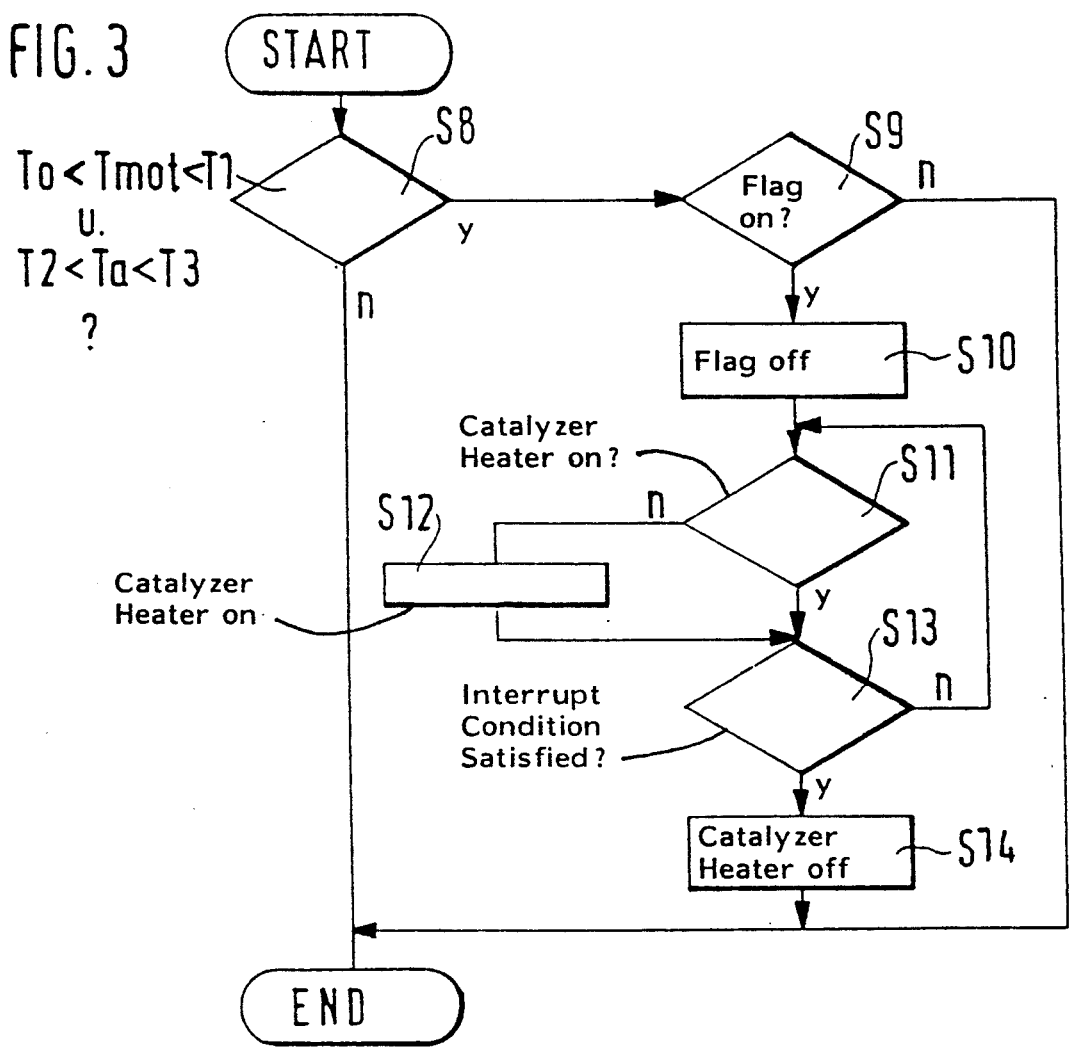
Figure 4:
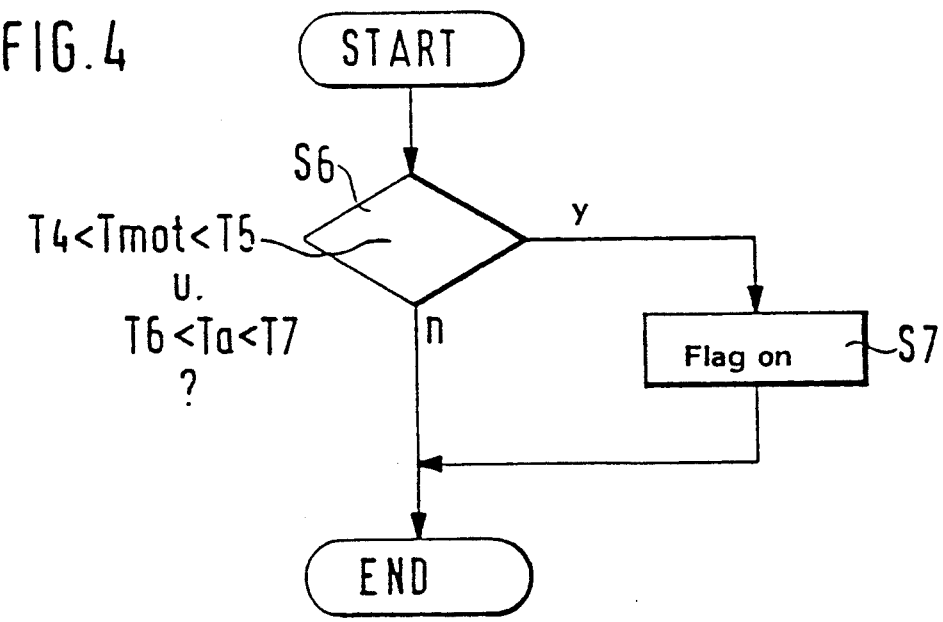

The program parts shown in FIGS. 3 and 4 show an embodiment of the method of the invention. The program parts are run through as subprograms of a higher level engine control program after each start of the engine. Because the method of the invention has as its object the improvement of the conversion rate of the catalyzer at the start with an operationally warm engine, in the explanation which follows it will first be assumed that the engine temperature Tmot as well as the temperature of the intake air Ta lie within the temperature intervals T0 to T1 and T2 to T3, respectively. With this precondition, the result of the inquiry step S8 in FIG. 3 is positive and there is a branching to the step S9 wherein the value of the condition variable (here identified as "flag") is checked. This variable can assume two conditions corresponding to the conditions "flag on" and "flag off". Which of the two values is set directly after a start for a warm engine (second start) is dependent upon the temperature of the engine and the temperature of the intake air at the time point of the previous start (first start).

For the explanation which follows, the condition "flag on" is assumed. This is the case when special conditions have been satisfied for the first start. In step S10, a switchover to condition "flag off" is made before the catalyzer heat function is activated by the steps S11 and S12. In addition to the heating measures used for a cold engine, a targeted mixture leaning for increasing exhaust-gas temperature can be used therefor. Thereafter, the loop of the steps S12 and S13 is run through until it is determined in step S13 that an interrupt condition is satisfied which can be satisfied by various occurrences such as exceeding an engine speed threshold, temperature threshold, time threshold, counter threshold, throttle flap angle threshold, road speed threshold or load threshold or also by setting a driving stage for a vehicle equipped with an automatic transmission. After leaving the loop, the catalyzer heating measures are cancelled in step S14 before leaving the subprogram. If the temperature condition checked in step Sl at the beginning of the operating phase is not satisfied, then no catalyzer heating measures are initiated. This case is represented in FIG. 3 by the step sequence start, S8 and end. The step sequence S8, S9 and end are then run through when the condition "flag off" has been switched for a satisfied temperature condition at the time point of the second start.

FIG. 4 shows the flowchart of a routine which is run through each time at start and which determines the condition of the variable "flag" at the start of the next operation of the engine. In the step So, the temperatures of the engine Tmot and the intake air TA are checked as to whether they lie within pregiven intervals with one interval being delimited by the temperatures T4 and T5 and the other interval being delimited by T6 and T7. If this condition is satisfied, then the condition "flag on" is switched in the step S7 whereas, otherwise, the condition "flag off" is maintained.

In combination with the method shown in FIG. 3, the possibility is provided that the catalyzer heating function for a warm engine (second start) is only then activated when special conditions were present for the first start.

If, for example, the situation at the time point of the first start is characterized with (n), then from FIG. 2, the determination can be made that the special condition is then satisfied when the measured values for Tmot and Ta lie within the region (a). As explained above, the catalyzer heating measures are only then initiated when for the following start at a later time point in a situation (n+1), Tmot and Ta lie within the region (b).

In the interruption between the operating phases of the engine, the condition of the variable "flag" can for example be stored in a permanent RAM as is used for modern engine controls. The integration of the described program steps in an existing engine concept which especially makes use of microprocessors and memory components is no problem for a person working in the area of engine controls and therefore does not have to be explained.

It is understood that the foregoing description is that of the preferred embodiments of the invention and that various changes and modifications may be made thereto without departing from the spirit and scope of the invention as defined in the appended claims.

What is claimed is:

1. A method for reducing the emission of toxic exhaust-gas components in an internal combustion engine equipped with a catalyzer and wherein measures can be taken for heating the catalyzer, the method comprising the steps of:
   checking to determine if a condition characteristic of a warm engine is satisfied when the engine is started; and,
   if said condition is satisfied, then initiating said measures for accelerating the heating of the catalyzer.

2. The method of claim 1, wherein said measures are initiated after a start of a warm engine only if a temperature condition was satisfied for the previous start.

3. The method of claim 1, wherein the heating of the catalyzer is accelerated by increasing the heat energy transported by the exhaust gas.

4. The method of claim 3, wherein the heat energy is increased by displacing the ignition to later firing points.

5. The method of claim 3, wherein the heat energy is increased by increasing the idle speed of the engine.

6. The method of claim 3, wherein the heat energy is increased by providing a targeted leaning of the air/fuel mixture.

7. The method of claim 3, wherein the heat energy is increased by displacing the ignition to later firing points, increasing the idle speed of the engine and providing a targeted leaning of the air/fuel mixture.

8. The method of claim 1, wherein the measures for the accelerated heating of the catalyzer are discontinued when a further condition is satisfied.

9. The method of claim 8, wherein said further condition is satisfied by exceeding a temperature threshold.

10. The method of claim 8, wherein said further condition is satisfied by exceeding an engine speed threshold.

11. The method of claim 8, wherein said further condition is satisfied by exceeding a threshold characterizing the load on the engine.

12. The method of claim 8, wherein said further condition is satisfied by exceeding the time.

13. The method of claim 8, wherein said further condition is satisfied by exceeding a road speed threshold.

14. The method of claim 8, wherein said further condition is satisfied by exceeding a throttle flap angle threshold.

15. The method of claim 8, wherein said further condition is satisfied by exceeding a counter threshold.

16. The method of claim 8, wherein said further condition is satisfied by setting a driving mode for a motor vehicle equipped with an automatic transmission.

17. The method of claim 8, wherein said further condition is satisfied by exceeding the combination of two or more of the following: a temperature threshold, engine speed threshold, a threshold characterizing the load on the engine, a time, a road speed threshold, a throttle flap threshold and a counter threshold and/or by setting a driving mode for a motor vehicle equipped with an automatic transmission.

18. A method for reducing the emission of toxic exhaust-gas components in an internal combustion engine equipped with a catalyzer and wherein measures can be taken for heating the catalyzer, the method comprising the steps of:

interrogating temperature values of at least the engine in a situation (n) which is defined as having existed at the beginning, during or at the end of a previous operating phase of the engine;

again interrogating temperature values of at least the engine in a situation (n+1) which is defined as existing at the start of the next operating situation; and, initiating measures for heating the catalyzer when temperature values in both situations lie within pregiven ranges.

19. The method of claim 18, wherein said situations (n) and (n+1) are defined by a start of the engine.

20. The method of claim 18, comprising the further steps of:

interrogating the temperature of the intake air in addition to said steps of interrogating said temperature values; and, initiating said measures for heating the catalyzer only when the intake air temperatures satisfy specific conditions in both situations.

* * * * *